US012674103B2

(12) United States Patent　　　　(10) Patent No.:　US 12,674,103 B2
Noel et al.　　　　　　　　　　　　(45) Date of Patent:　　　Jul. 7, 2026

(54) PROCESS WITH CONTINUOUS CATALYTIC REGENERATION FOR TREATING A HYDROCARBON FEEDSTOCK

(71) Applicant: IFP ENERGIES NOUVELLES, Rueil-Malmaison (FR)

(72) Inventors: Ludovic Noel, Rueil-Malmaison (FR); Christophe Pierre, Rueil-Malmaison (FR); Sébastien Lecarpentier, Rueil-Malmaison (FR); Pierre-Yves Le Goff, Rueil-Malmaison (FR); Victorian Gazeyeff, Rueil-Malmaison (FR); Matthieu Lafontaine, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 230 days.

(21) Appl. No.: 18/563,540

(22) PCT Filed: May 20, 2022

(86) PCT No.: PCT/EP2022/063766
§ 371 (c)(1),
(2) Date: Nov. 22, 2023

(87) PCT Pub. No.: WO2022/248362
PCT Pub. Date: Dec. 1, 2022

(65) Prior Publication Data
US 2024/0228892 A1　　Jul. 11, 2024

(30) Foreign Application Priority Data
May 28, 2021　(FR) ..................................... 2105595

(51) Int. Cl.
*C10G 35/12* (2006.01)
*B01J 8/00* (2006.01)
*B01J 8/08* (2006.01)

(52) U.S. Cl.
CPC ............ *C10G 35/12* (2013.01); *B01J 8/0025* (2013.01); *B01J 8/082* (2013.01);
(Continued)

(58) Field of Classification Search
CPC　C10G 35/12; C10G 2400/02; C10G 2400/20; C10G 2400/22; C10G 2400/30;
(Continued)

(56) References Cited

U.S. PATENT DOCUMENTS 2,758,059 A　8/1956　Berg
3,647,680 A　3/1972　Greenwood et al.
(Continued)

FOREIGN PATENT DOCUMENTS

DE　2265608 C2　1/1988
FR　2657087 A1　7/1991

OTHER PUBLICATIONS

International Search report PCT/EP2022/063766 dated Aug. 19, 2022 (pp. 1-5).

*Primary Examiner* — In Suk C Bullock
*Assistant Examiner* — Jason Y Chong
(74) *Attorney, Agent, or Firm* — Csaba Henter; MILLEN, WHITE, ZELANO & BRANIGAN

(57) ABSTRACT

The invention relates to a process for the catalytic treatment of a hydrocarbon feedstock with continuous catalytic regeneration, in which process said feedstock is successively circulated in a plurality of reaction zones in series (R1, R2, (Continued)

R3, R4), the catalyst circulating as a moving bed successively in the plurality of reaction zones and flowing from the upstream end to the downstream end of each of the reaction zones and being transported by a carrier gas phase g1 from the downstream end of one reaction zone to the upstream end of the next reaction zone, characterized in that said carrier gas phase g1 has a density of greater than or equal to 1 kg/m$^3$.

20 Claims, 3 Drawing Sheets

(52) U.S. Cl.
CPC ................. *B01J 2208/00106* (2013.01); *B01J 2208/00539* (2013.01); *B01J 2208/00584* (2013.01); *B01J 2208/00628* (2013.01); *C10G 2400/20* (2013.01); *C10G 2400/22* (2013.01); *C10G 2400/30* (2013.01)

(58) Field of Classification Search
CPC ..... C10G 51/026; B01J 8/0015; B01J 8/0025; B01J 8/082; B01J 8/12; B01J 8/125; B01J 2208/00106; B01J 2208/00539; B01J 2208/00584; B01J 2208/00628; B01J 2208/00743
See application file for complete search history.

(56) References Cited

U.S. PATENT DOCUMENTS

| | | | |
|---|---|---|---|
| 3,978,150 | A | 8/1976 | McWilliams, Jr. |
| 4,172,027 | A | 10/1979 | Ham et al. |
| 4,210,519 | A | 7/1980 | Boret et al. |
| 4,233,268 | A | 11/1980 | Boret et al. |
| 5,336,829 | A | 8/1994 | Boitiaux et al. |
| 7,288,501 | B2 | 10/2007 | Auer et al. |
| 9,657,235 | B2 | 5/2017 | Pagot et al. |
| 2012/0103873 | A1 | 5/2012 | Sardar et al. |
| 2017/0252726 | A1 | 9/2017 | Avenier et al. |

PROCESS WITH CONTINUOUS CATALYTIC REGENERATION FOR TREATING A HYDROCARBON FEEDSTOCK

The present invention relates to processes for the catalytic treatment of hydrocarbon feedstocks, with continuous catalytic regeneration. Continuous catalytic regeneration is also known by the abbreviation CCR. These processes notably comprise the catalytic reforming of hydrocarbon feedstocks, notably of naphtha type, so as to convert them into aromatic compounds and/or petrols, and the dehydrogenation of paraffins, so as to convert them into olefins.

PRIOR ART

Generally, the object of a catalytic reforming unit is to convert naphthenic and paraffinic (n-paraffin and isoparaffin) compounds into aromatic compounds. The main reactions involved are the dehydrogenation of naphthenes and the dehydrocyclization of paraffins to give aromatics, the isomerization of paraffins and of naphthenes. Other "side" reactions may also take place, such as the hydrocracking and the hydrogenolysis of paraffins and naphthenes, the hydrodealkylation of alkylaromatics, giving rise to light compounds and lighter aromatics, and also the formation of coke at the surface of the catalysts.

Let us first take the case of catalytic reforming processes with continuous catalytic regeneration: The feedstocks typically sent to a catalytic reforming unit are rich in paraffinic and naphthenic compounds and relatively poor in aromatic compounds. They are generally naphthas resulting from the distillation of crude oil or natural gas condensates. Other feedstocks may also be available, containing variable contents of aromatics, namely heavy catalytic cracking naphthas, heavy coker naphthas or heavy hydrocracking naphthas, or also steam cracking petrols. The invention will more particularly focus on the conversion of a naphtha-type feedstock.

Moreover, it may be necessary to pretreat the feedstocks, notably those of naphtha type, before treating them by catalytic reforming: this pretreatment is generally a hydrotreatment. The term "hydrotreatment" refers to all of the purification processes that allow the various impurities contained in hydrocarbon feedstocks to be removed under the action of hydrogen. Thus, hydrotreatment processes make it possible to remove, through the action of hydrogen, impurities present in the feedstocks such as nitrogen (referred to as hydro-deazotization), sulfur (referred to as hydro-desulfurization), oxygen (referred to as hydro-deoxygenation), and the metal-containing compounds which can poison the catalyst and give rise to operating problems during downstream treatments such as reforming (referred to as hydro-demetallization). An example of a hydrotreatment process is described in patent FR 2 966 835.

Examples of catalytic reforming processes of regenerative type and with optimized catalytic distribution are described in patents FR 2 657 087 and FR 3 024 460, with a reforming unit using a succession of reactors mounted in series, each being equipped with a mobile catalytic bed, the effluent from each reactor, except for the last one (the one that is furthest downstream), being heated before introduction into the next reactor, so as to counterbalance the endothermicity of the reforming reactions and to maintain a sufficient temperature in each of the reactors so that the desired conversion reactions take place.

Let us now take the case of catalytic dehydrogenation processes with continuous catalytic regeneration: In the case of the dehydrogenation of paraffins, for instance the dehydrogenation of propane so as to produce propylene, the paraffinic feedstock is pretreated (adsorption, drying, removal of the C4+ fractions, etc.) before entering the actual dehydrogenation unit including the reaction section and the continuous catalytic regeneration (CCR) section. The dehydrogenation reaction takes place in the reactor in which the feedstock is in contact with the catalyst which circulates in a moving bed. This reaction is highly endothermic, and the effluent leaving the first reactor must thus be heated in an oven in order to obtain the desired temperature on entering the second reactor. This sequence is then repeated in the following reactors. A propane dehydrogenation unit is generally composed of four reactors in series, whereas in the case of butane, three reactors may suffice. On leaving the reaction section, the effluent undergoes a selective hydrogenation of the diolefins to monoolefins, and is treated so as to remove the light compounds (C2–); finally, a propane-propylene splitter separates the propylene produced from the residual propane which is recycled. Examples of paraffin dehydrogenation processes using continuous catalytic circulation (CCR) are given in U.S. Pat. No. 3,978,150 for a configuration of superposed react ion zones, and in U.S. Pat. No. 5,336,829 for a configuration of reactors in series side by side.

The invention is more particularly focused on the conveying, in a moving bed, of the catalyst in the reforming or dehydrogenation unit: the catalyst circulates successively in the reactors in series, flowing by gravity in each of the reactors from the top part to the bottom part thereof, taking the example of vertically oriented reactors arranged side by side, as described in the abovementioned patents. To circulate from one reactor to the next, the catalyst is withdrawn continuously from the bottom part of one reactor and transported to the top part of the next reactor via one or more pipes external to the reactors. Once withdrawn from the bottom part of the last of the reactors, the spent catalyst is sent to a regeneration reactor, and, once regenerated, it is again sent into the top part of the first of the reactors in series to recommence a production-regeneration cycle.

Patent FR 2 657 087 more particularly describes means used for circulating the catalyst from one reactor to the next, and then from the last reactor of the series to the regeneration reactor. It is a matter, in said patent, of introducing the catalyst into the top part of the first reactor of the series of reactors, thus the one that is the most upstream, via a plurality of pipes in which it is conveyed in the form of a moving bed. It is then withdrawn via a plurality of pipes converging in a common pipe via which it reaches a vessel known as the "lift pot". This withdrawal is performed continuously, the regularity of the flow rate of the catalyst being ensured by suitable regulation by means of a carrier gas, which is hydrogen, and which may be produced by the reforming unit itself or may be pure or recycled hydrogen, and which is injected via a pipe into this "lift pot". The catalyst is then entrained from the "lift pot" to the next reactor via a lifting device, referred to as a "lift", by the carrier gas; it then reaches a container from which, via a plurality of pipes, it reaches the top part of the second reactor, where the same pathway recommences up to the third reactor, and so on. It is finally withdrawn from the bottom part of the last reactor of the series, and is then referred to as "spent" catalyst, via a plurality of pipes which convey it into an "accumulator-decanter" vessel via another lifting means of "lift" type. It is subsequently conveyed via another carrier gas, generally nitrogen, to the regeneration reactor. The catalyst must be purged of any trace of hydrogen beforehand, since the regeneration of the catalyst takes place under oxidizing conditions: transition devices between the circuits under hydrogen and under nitrogen must thus be provided.

These means implemented by pneumatic transport for circulating the catalyst from one reactor to another are efficient. It may arise, however, that in certain working configurations, they may have certain drawbacks. Specifically, they comprise a certain number of pipes, which have a specific geometry, notably with elbows, which may lead to risks of deposition in the pipes, or else risks of erosion of the walls of the pipes, or even undesired attrition on the catalyst particles.

The aim of the invention is thus to improve the design of the means for conveying the catalyst from one reactor to the next, in a unit for the reforming of hydrocarbon feedstocks (for example treating feedstocks of naphtha type) or for the dehydrogenation of hydrocarbon feedstocks (for example treating feedstocks of paraffin type).

SUMMARY OF THE INVENTION

One subject of the invention is, firstly, a process for the catalytic treatment of a hydrocarbon feedstock with continuous catalytic regeneration, in which process said feedstock is successively circulated in a plurality of reaction zones in series, the catalyst circulating as a moving bed successively in a plurality of reaction zones flowing from the upstream end to the downstream end of each of the reaction zones and being transported by a carrier gas phase from the downstream end of one reaction zone to the upstream end of the next reaction zone. According to the invention, said carrier gas phase has a density of greater than or equal to 1 kg/m$^3$, notably greater than or equal to 1.2 kg/m$^3$ or 1.4 kg/m$^3$ or 1.6 kg/m$^3$ or 1.8 kg/m$^3$ or 2 kg/m$^3$ or greater than or equal to 3 kg/m$^3$, and preferably not more than 5 kg/m$^3$ or not more than 4 kg/m$^3$.

This density is measured under the operating conditions (of temperature and pressure) of the process under consideration, notably at a temperature T of between 200 and 550° C., and at an absolute pressure P of between 0.1 and 0.7 MPa.

It is notably measured at a temperature of 300° C. and at a pressure of 0.55 MPa.

In the case of catalytic reforming, this density is notably measured at a temperature T1 of between 200° C. and 450° C., notably at 300° C., and at an absolute pressure P1 of between 0.4 MPa and 0.7 MPa, notably of 0.5 MPa, which are the temperatures and pressures usually encountered in the lift pipes in reforming.

In the case of dehydrogenation, this density is notably measured at a temperature T2 of between 300 and 550° C., notably at 400° C., and at an absolute pressure P2 of between 0.1 and 0.4 MPa, notably of 0.25 MPa, which are the temperatures and pressures usually encountered in the lift pipes in dehydrogenation.

Advantageously, the catalytic treatment according to the invention is catalytic reforming, notably treating a feedstock of naphtha type, for the purpose of producing aromatic hydrocarbons and/or petrols, or catalytic dehydrogenation, notably treating a feedstock of paraffin type, for the purpose of producing olefins.

Advantageously, said carrier gas phase g1, for achieving these densities, has a density at least 30% greater than, notably at least 50% and preferably at least two or three times greater than that of the hydrogen measured at a temperature T of between 200 and 550° C., and at an absolute pressure P of between 0.1 and 0.7 MPa, and notably in the case of reforming, at a temperature T1 of between 200° C. and 450° C., notably at 300° C., and at an absolute pressure P1 of between 0.4 MPa and 0.7 MPa, notably of 0.5 MPa, and in the case of dehydrogenation, at a temperature T2 of between 300 and 550° C., notably at 400° C., and at an absolute pressure P2 of between 0.1 and 0.4 MPa, notably at 0.25 MPa.

Throughout the present text, the terms "upstream" and "downstream" are understood with reference to the general direction of flow of the feedstock passing through the reactors of the reforming or dehydrogenation facility.

Throughout the present text, the term "gas phase" means a gas or a mixture of different gases, which may also include impurities.

The "reaction zone" should be understood as being a reactor, or a plurality of reactors, or a distinct portion of a reactor, with all the ad hoc equipment known to a person skilled in the art (such as the introduction and withdrawal apertures connected to the pipes, valves, heat control means, etc.).

The feedstock of naphtha type (in the case of reforming) or of paraffin type (in the case of dehydrogenation) according to the invention may have undergone one or more treatments prior to the reforming or the dehydrogenation, and notably a hydrotreatment.

The invention is thus focused not on a disruption in the choice of the mechanical means, such as pipes, valves, vessels, etc., used for transporting the catalyst, or on their arrangement, but rather on a particular choice of the characteristics of the carrier gas, namely a choice of increased density. It turns out that, surprisingly, choosing a denser carrier gas than usual (namely hydrogen or "enriched" hydrogen, i.e. hydrogen comprising up to 10% by volume of another gas of light hydrocarbon type under the pressure and temperature T, P operating conditions usually used) has a very favourable impact on the circulation of the catalytic particles in the various pipes conveying them from one reactor to another: specifically, the risks of deposition of particles on the walls of the pipes, more particularly in the pipe portions that are horizontal or oblique (not vertical) or in "elbows" connecting pipe portions (in the non-rectilinear portions thereof), decrease greatly, or even disappear entirely. This is likewise the case for the risks of erosion of the walls, which makes it possible to reduce the operations for the verification/maintenance (replacement, cleaning) of these pipes. Reduction or even elimination of the risks of attrition of the particles has also been observed, which can uncontrollably change their particle size characteristics, which is to be avoided/limited if it is desired to control their catalytic efficiency.

Preferably, said carrier gas phase has a density at least 30% greater than, notably at least 50% and preferably at least two or three times greater than that of the hydrogen measured at a temperature T of between 200 and 550° C., and at an absolute pressure P of between 0.1 and 0.7 MPa. The invention thus preferentially targets a density that is very markedly higher than the usual density (relative to hydrogen and also relative to "enriched" hydrogen), to maximize the effect obtained.

To obtain a high-density carrier gas, several embodiments exist according to the invention, which are alternatives or may be cumulated together.

According to a first embodiment, the invention chooses to modify the chemical composition of the carrier gas phase:

advantageously, said carrier gas phase comprises at least one gas having a molar mass higher than that of hydrogen, notably nitrogen and/or at least one C1-C6 light hydrocarbon.

Nitrogen has the advantage of being much denser than enriched hydrogen, by a factor of more than six. It also has the advantage of being the gas generally used to serve as carrier gas for the spent catalyst from the last reactor to the regenerator, and from the regenerator to the first reactor.

Light hydrocarbons have the advantage of possibly being already available in the reforming unit, by being formed during the reforming reaction steps. They are in the form of a mixture of C1-C6 hydrocarbons, generally with a majority of C1-C3 hydrocarbons.

The carrier gas phase may include a mixture of these various types of gases, and may also combine hydrogen with at least one of these various gases, its density then being understood as the mean density of the mixture of gases under consideration.

Said carrier gas phase may thus comprise at least 25% by volume, notably at least 45% by volume or at least 50% by volume or at least 80% by volume of gas, and up to 100% by volume of gas having a molar mass greater than that of hydrogen.

In the case of the 100%, said carrier gas phase g1 then comprises only one or more gases having a molar mass greater than that of hydrogen (not taking into account any impurities).

The gas(es) having a molar mass greater than that of hydrogen may originate from the reforming process (or the dehydrogenation process) itself, as recycling reagent or product or by-product of the reforming. This is the case for C1-C6 hydrocarbons or hydrogen (or rather, as mentioned above, generally of "enriched" hydrogen containing up to 10% of another gas).

According to a second embodiment, the density of the carrier gas phase is increased while reducing its temperature relative to the conventional temperature T (between 200 and 550° C.): the temperature of said carrier gas phase g1 is adjusted to a temperature T3 below 200° C., notably between 50° C. and 150° C., to increase the density thereof. The temperature of the carrier gas phase may be reduced by any type of known means, for instance heat exchangers or coolers. It may then be required to heat the particles before they enter the next reactor.

According to a third embodiment, the density of the carrier gas phase is increased while increasing its pressure relative to the conventional pressure P (between 0.1 and 0.7 MPa): the pressure of said carrier gas phase g1 is adjusted to a pressure P3 of at least 1 MPa, notably between 1.5 MPa and 4 MPa, to increase the density thereof. The gas pressure is modified/increased by any known means, notably by redimensioning the compressors already present, generally, to place the gas under pressure so as to make it circulate and so that it transports the particles in the desired manner.

The invention may be applied to very varied reaction zone designs: The reaction zones may be located, respectively, in reactors arranged side by side. The reaction zones may also be superposed on each other, the one that is the most upstream being placed at the top and the zone that is the most downstream being the one that is the bottom-most. This thus gives a "stack" of reaction zones from top to bottom; this is a configuration that is described, for example, in U.S. Pat. No. 3,647,680.

In any configuration, the catalyst flows continuously in each reactor/reaction zone from its upstream top end to its downstream bottom end, and is then transported by said carrier gas phase via a fluid connection from the downstream bottom end of one reactor/reaction zone to the upstream top end of the next reactor/reaction zone of the series of reactors/reaction zones. Finally, it is transported from the most downstream reaction zone to the regenerator, and finally from the regenerator to the most upstream reaction zone.

The fluid connections allowing the transport by the gas phase of the catalyst particles notably include one or more pipes connecting at least one outlet of one reactor/reaction zone to at least one inlet of the next reactor/reaction zone, and optionally vessels or pots. Possible configurations are described in the abovementioned patent FR 2 657 087.

Advantageously, the catalyst is transported, via a regeneration gas phase g2, from the downstream end of the last reaction section of the series of reaction sections to a regeneration zone and from the regeneration zone to the upstream end of the first reaction zone of the series of reaction sections.

Preferably, the regeneration gas phase g2 is inert, notably based on nitrogen, and it may be necessary firstly to purge the catalyst of any non-inert gas before it is transported to the regeneration zone.

According to one variant of the invention, the regeneration gas phase g2 and the carrier phase g1 have the same composition and/or are under the same temperature and/or pressure conditions. Said gas phase may be nitrogen, for example.

A subject of the invention is also any facility for the catalytic treatment of a hydrocarbon feedstock with continuous catalytic regeneration, in particular for catalytic reforming or dehydrogenation, using the process described above.

A subject of the invention is also a facility for the catalytic treatment of a hydrocarbon feedstock with continuous catalytic regeneration, notably for the catalytic reforming of a hydrocarbon feedstock, of naphtha type, for the purpose of producing aromatic hydrocarbons and/or petrols, or for the dehydrogenation of paraffins for the purpose of producing olefins. This facility comprises, according to the invention, a plurality of reaction zones connected in series in which the feedstock circulates successively, and fluid connections ensuring the transport of the catalyst via a carrier gas phase g1 from the downstream end of one reaction zone to the upstream end of the next reaction zone. Said facility includes devices for adjusting the temperature and/or pressure and/or composition of said carrier gas phase g1 to adjust its density to a density of greater than or equal to 1 $kg/m^3$, notably greater than or equal to 1.2 $kg/m^3$ or 1.4 $kg/m^3$ or 1.6 $kg/m^3$ or 1.8 $kg/m^3$ or notably greater than or equal to 2 $kg/m^3$ or greater than or equal to 3 $kg/m^3$, and preferably not more than 5 $kg/m^3$ or not more than 4 $kg/m^3$ (under the operating conditions of the facility).

The devices for adjusting the pressure of said carrier gas phase g1 may advantageously include one or more compressors.

The devices for adjusting the temperature of said carrier gas phase g1 may advantageously include one or more heat exchangers and/or one or more coolers.

The devices for adjusting the composition of said carrier gas phase g1 may advantageously include a gas mixer fed with a source of hydrogen and a source of nitrogen and/or a source of C1-C6 hydrocarbons, said sources of hydrogen and of C1-C6 hydrocarbons preferably being obtained from the catalytic treatment (notably reforming) performed in the facility. A pipe for the introduction of enriched hydrogen and a pipe for the introduction of light hydrocarbons produced by the facility may thus be provided, these pipes converging into a single pipe with the desired proportion between the two types of gas to constitute the carrier gas phase desired to be conveyed in the "lift" pipes to transport the catalytic particles, with any means known for doing so (valves, pipe proportions, compressors, etc.).

As mentioned above, the various embodiments of the invention may be combined, in pairs or all together, for example by modifying both the chemical composition of the gas phase and its temperature (or its pressure), or both its pressure and its temperature.

The invention will be detailed below with the aid of non-limiting implementation examples, concerning the reforming process with continuous catalytic regeneration (CCR). These examples may be transposed in a very similar manner to a dehydrogenation process with continuous catalytic regeneration.

DESCRIPTION OF THE EMBODIMENTS

In the examples that follow, "naphtha" refers to a petroleum cut of any chemical composition, and preferably having a distillation range of between 50° C. and 250° C. The chemical family distribution identified by PONA (P for paraffins, O for olefins, N for naphthenes and A for aromatics) may be any distribution.

The term "petrol" refers to a petroleum fraction with a distillation range similar to that of naphtha and having an octane number of greater than 95 and preferentially greater than 98.

The term "aromatic bases" refers in the broad sense to xylenes (para-xylene, meta-xylene, ortho-xylene), ethylbenzene, toluene and benzene, and optionally heavier aromatics such as styrene monomer, cumene or linear alkylbenzenes.

The term "reformate" refers to a petrol cut with a high octane number produced by catalytic reforming.

In the rest of the description of the figures, the term "reactor" should be understood as a reaction zone.

The feedstock that is treated in the context of the examples described below of the process of the invention is a hydrocarbon feedstock of naphtha type which it is desired to treat by catalytic reforming. This feedstock is a hydrocarbon cut rich in paraffinic and naphthenic compounds and relatively poor in aromatic compounds. A naphtha feedstock is derived, for example, from the atmospheric distillation of crude oil or a natural gas condensate. The process according to the invention also applies to catalytic cracking (FCC), coking or hydrocracking heavy naphthas or alternatively steam-cracking petrol. These feedstocks, which are more or less rich in aromatic compounds, may be used for feeding a catalytic reforming unit for the production of petrol bases or aromatic bases.

In general, this naphtha is pretreated in a hydrotreatment unit to remove or to sufficiently reduce the content of impurities (including at least one of the following impurities: sulfur, nitrogen, water, halogens, olefin and diolefin where appropriate, mercury, arsenic and other metals) which are liable to poison the reforming catalyst. This hydrotreatment step is known per se and will therefore not be described herein.

The reforming or dehydrogenation facility uses a conventional catalyst. As reforming or dehydrogenation catalyst, mention may be made of catalysts comprising a support of silica and/or alumina type, a metal from the platinum group, tin, phosphorus, optionally a halogen such as chlorine and optionally a third metal as described in patent FR 2 947 465 and optionally an alkali metal or alkaline-earth metal such as potassium.

The catalyst is in the form of formed objects, for example in the form of substantially spherical beads with a diameter generally between 1 and 3 mm, notably between 1.5 and 2 mm, and their bulk density is generally between 0.4 and 1, preferably between 0.5 and 0.9 or between 0.55 and 0.8.

Figure 1:
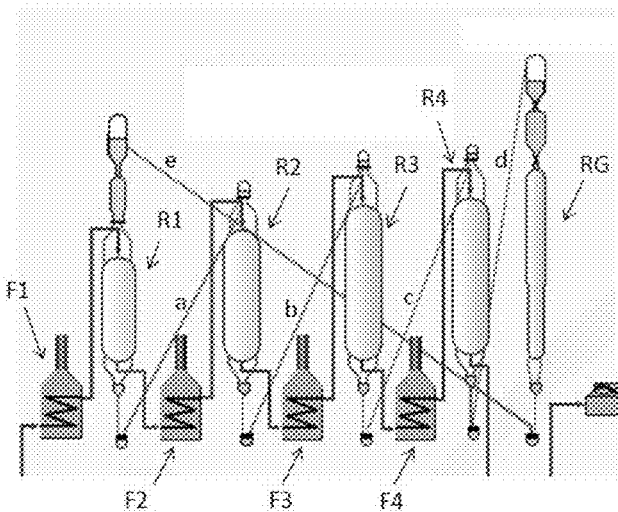
FIG. 1 represents a portion of a catalytic reforming facility which may apply the invention, notably the reaction section and the regeneration section of the process. It is extremely schematic and the various elements represented are not necessarily to scale: it is a flow diagram.

FIG. 1 represents a portion of a catalytic reforming facility functioning with continuous regeneration (CCR) and which can apply the invention: (a dehydrogenation facility is of similar/analogous design).

The naphtha feedstock 1 described above is sent into the catalytic reforming facility which comprises four reactors R1, R2, R3, R4 equipped with a moving bed of catalytic reforming catalyst. The reforming facility functions under operating conditions and in the presence of a catalyst which allow optimization of the transformation of the naphthenic compounds (cycloalkanes) and/or paraffinic compounds into aromatic hydrocarbon compounds. In order to limit the formation of coke on the reforming catalyst, the reforming step is performed in the presence of hydrogen.

The facility also comprises a spent catalyst regenerator RG, and ovens F1, F2, F3, F4: the feedstock 1 is heated in oven F1, and is then sent to the inlet of the first reactor R1 in the top part, it circulates from top to bottom in the reactor R1, then the effluent from the reactor R1 is withdrawn at the bottom part, is heated in oven F2 and is then sent to the inlet, at the top, of the next reactor R2, and so on with oven F3 and reactor R3, and then oven F4 and the last reactor R4. The effluent from the last reactor R4 then follows other treatments.

In very schematic terms, FIG. 1 represents the pathway of the catalyst from one reactor to another, with a carrier gas g1 and a regeneration carrier gas g2: as described in the abovementioned patent FR 2 657 087, with the aid of pipes and of "lift pots" ensuring the required fluid connection, the carrier gas g1 conveys by pneumatic transport the catalyst from the bottom part of one reactor to the top part of the next reactor, from the most upstream reactor R1 to the most downstream reactor R4 via a system of pipes and of "lift pots": these are the pathways a, b, c in FIG. 1. At the outlet of reactor R4, the spent catalyst is conveyed via the gas g2 along a pathway d to the regenerator RG, also via fluid connections comprising pipes. Finally, the regenerated catalyst is conveyed via the gas g2 along a pathway e from the outlet of the regenerator RG to the inlet at the top part of the reactor R1 to recommence a production cycle through the facility.

This catalytic reforming facility generally functions within the following operating ranges:

a mean reactor inlet temperature of between 420° C. and 600° C.;

a pressure of between 0.3 and 1 MPa;

$H_2$/feedstock mole ratio of between 0.2 and 8 mol/mol;

a mass space velocity, expressed as being the ratio of the mass flow rate of the feedstock to the mass of catalyst, of between 0.5 and 8 $h^{-1}$.

In this case of reforming, the lift pipes transporting the catalyst from one reactor to the next are at temperatures of the order of 200 to 450° C., and their pressure is within absolute pressure values of between 0.4 MPa and 0.7 MPa.

It should be noted that a catalytic dehydrogenation facility generally functions within the following operating ranges:

a mean reactor inlet temperature of between 500° C. and 700° C.;

a pressure of between 0.1 and 0.4 MPa;

$H_2$/feedstock mole ratio of between 0.2 and 8 mol/mol, notably in the region between 1 and 4 mol/mol or in the region of 0.5 mol/mol;

a liquid space velocity, expressed as being the ratio of the volume flow rate of the feedstock to the volume of catalyst, notably between 2 and 6 $h^{-1}$.

In this case of dehydrogenation, the lift pipes transporting the catalyst from one reactor to the next are at temperatures of the order of 300 to 550° C., and their pressure is within absolute pressure values of between 0.1 MPa and 0.4 MPa.

The carrier gas (also known as the vector gas) g1 is conventionally enriched hydrogen and the regeneration carrier (vector) gas g2 is nitrogen.

In the case of a reforming (or dehydrogenation) unit, the gas g1 is conventionally a gas predominantly consisting of hydrogen (of the order of at least 90% by volume) and may also contain impurities in small amounts. It is characterized by a relatively low density, under the operating conditions (absolute pressure of between 0.4 and 0.7 MPa, temperature of between 200 and 450° C.); its density is generally less than 1 $kg/m^3$, notably between 0.4 and 0.8 $kg/m^3$.

The pneumatic transport of solid catalytic particles (beads or other objects) is governed by characteristic velocities for distinguishing the various flow regimes and for identifying any disturbances. For the vertical pipe portions, the choking velocity Uch corresponds to the minimum velocity of the carrier gas which allows the particles to be transported in dilute phase in the pipe.

Figure 2:
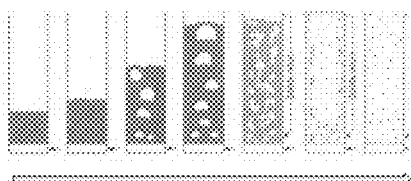
FIG. 2 schematically represents the various flow regimes of the catalyst as a function of the velocity of the carrier gas in a vertical rectilinear pipe portion used in the facility of FIG. 1.

FIG. 2 schematically represents the circulation of the catalytic particles used in the facility of FIG. 1, according to the velocity of the carrier gas g1 in a vertical rectilinear pipe portion. It is taken from the publication Yang W.-C. (2003) Handbook of Fluidization and Fluid-Particle Systems, CRC Press. The arrow represents a carrier gas velocity increasing from one case to the next:

in the case 2a, the gas velocity is insufficient, the particles remain in a fixed bed in the bottom part of the pipe portion, in the case 2b, the gas velocity is greater than in the case 2a, there is a "particulate" regime, in the case 2c, the gas velocity is greater than in the case 2b, there is an ebullated regime, in the case 2d, the gas velocity is greater than in the case 2c, there is a pulsed regime, in the case 2e, there is a turbulent regime, in the case 2f, there is a rapid fluidization regime, in the case 2g, there is pneumatic transport, which is the desired mode of transport of the particles in the invention for the vertical pipe proportions.

For the horizontal or oblique line portions, the saltation velocity Usalt corresponds to the minimum velocity of the carrier gas which allows homogeneous transport to be maintained and which prevents the deposition of particles at the bottom of the transport pipe.

Figure 3:
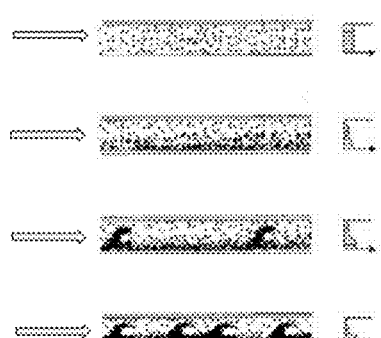
FIG. 3 schematically represents the various flow regimes of the catalyst as a function of the velocity of the carrier gas in a horizontal rectilinear pipe portion.

FIG. 3 schematically represents the circulation of the catalytic particles used in the facility of FIG. 1, according to the velocity of the carrier gas in a horizontal or oblique rectilinear pipe portion. This figure is taken from the publication Ph. Eeynier et al., Review of Modelling of Slush Hydrogen Flows, Journal of Computational Multiphase Flows 3(3): 123-146. With the gas velocity increasing from the case of FIG. 3.a to the case of FIG. 3.d (the arrows f indicate the direction of flow of the particles in the pipe portion), the small graph to the right of the pipe portions indicates the particle concentration in the pipe portion in the case 3.a, there is a fixed/stationary bed, in the case 3.b, there is a saltation regime, in the case 3.c, there is heterogeneous flow, in the case 3.d, there is homogeneous flow, which is the flow mode targeted by the invention for the catalytic particles in the horizontal or oblique pipe portions.

As shown in FIGS. 2 and 3, for insufficient carrier gas velocities (i.e. velocities lower than the choking and/or saltation limit velocities), the flow becomes heterogeneous and can give rise to particle concentration or velocity gradients in the transport pipe. This type of functioning is to be avoided, notably in the particular case of reforming units of CCR type, since it may lead to degradation of the constituent material of the "lift" line (the term "line" should be understood as a pipe or an assembly of pipes) (by erosion), or of the catalytic particles (by attrition), but may also lead to clogging which may also give rise to substantial pressure losses.

These limit velocities may be estimated by means of various correlations based on experimental observations: they are dependent on the operating conditions and on the properties of the gas and of the solid under consideration (terminal drop velocity, flow rate, size, etc.), and it has been shown that they are also notably dependent on the density of the carrier gas used for transporting the particles.

Figure 4:
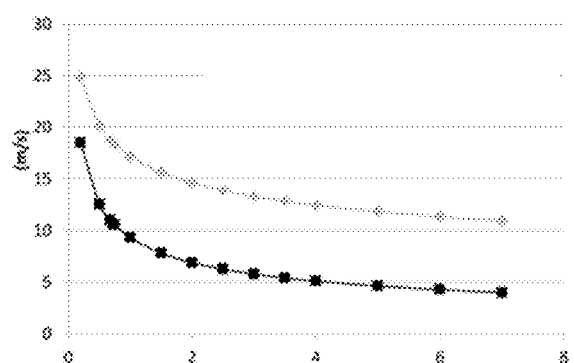
FIG. 4 is a graph representing the choking velocities for a vertical pipe and the saltation velocities for a horizontal pipe as a function of the density of the carrier gas.

Thus, FIG. 4 is a graph representing the choking velocity and the saltation velocity as a function of the density of the carrier gas for a characteristic example of an industrial CCR reforming unit: the y-axis shows the velocities in m/s and the x-axis shows the density of the carrier gas in $kg/m^3$. The curve with diamond-shaped points corresponds to the saltation velocity (horizontal pipes) and the curve with square points corresponds to the choking velocity (vertical pipes). FIG. 4 shows that the gas velocity required to ensure dilute and homogeneous flow in a lift line/pipe is proportionately lower the higher the gas density. However, FIG. 4 shows that this dependence on the density is not linear, and that it is proportionately greater in low-density zones, which are characteristic of lift lines using carrier gas g1 of enriched hydrogen type.

In the CCR reforming process, it is necessary to control the velocity of the catalytic particles in the lift lines, so as not to result in degradation of the pipes and of the catalyst, and so as to limit the pressure losses in the pipes: a target catalyst velocity (Ucata) is considered, which may be calculated by means of various correlations and from which the velocity of the vector gas g1 required (Ugas) to achieve this target velocity may be determined. The following relationship may be used to a first approximation:

$$Ugas = Ucata + Ut,$$

Ut being the terminal drop velocity of the catalytic particle.

Figure 5:
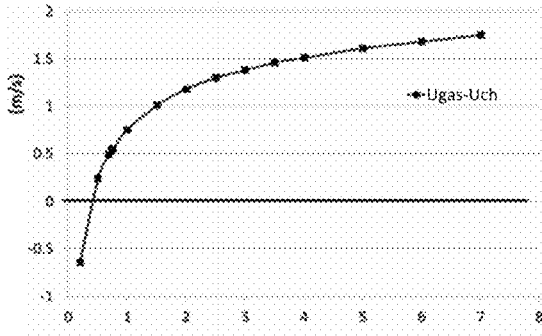
FIG. 5 is a graph representing the difference between the velocity of the carrier gas and the choking velocity as a function of its density for vertical pipe portions.

FIG. 5 shows the difference between the gas velocity Ugas calculated to achieve the desired catalyst velocity Ucata, and the choking velocity Uch in a vertical pipe (in m/s) as a function of the density of the carrier gas (in kg/m³): this figure shows that, for the lowest densities, the gas velocity Ugas is of the order of magnitude of the choking velocity Uch, or even less, which may give rise to disruptions in the flow (non-dilute regime). When the density of the vector gas increases, the gas velocity required to achieve the desired catalytic particle velocity becomes higher than the choking velocity, which makes it possible to ensure a dilute flow regime in the vertical lift pipes.

Figure 6:
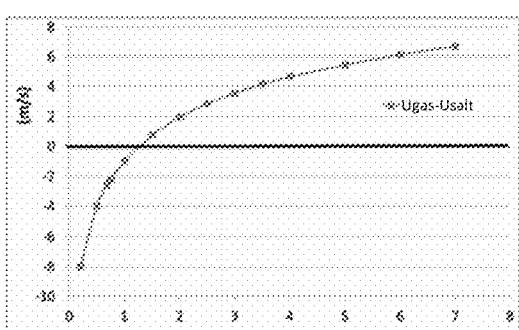
FIG. 6 is a graph representing the difference between the velocity of the carrier gas and the saltation velocity as a function of its density for oblique pipe portions.

FIG. 6 is a graph representing the difference between the gas velocity Ugas calculated to achieve the desired particle velocity Ucata and the carrier saltation velocity Usalt (in m/s) as a function of the carrier gas density for horizontal or oblique pipe portions: in a similar manner to in the preceding figure, FIG. 6 shows that, for a given catalyst velocity Ucata, the gas velocity Ugas may be less than the saltation velocity Usalt if the gas density is too low, and may thus bring about the deposition of particles in the horizontal or oblique parts of the line and give rise to disruptions in the flow.

Exploiting these results, the invention consisted in modifying the density of the vector gas g1 so as to improve the transport of the catalytic particles in the lift lines, more particularly in the vertical and oblique parts thereof, but also in the horizontal parts thereof when there are any, and thus to avoid any choking or saltation which may give rise to disruptions in flow.

The density of the carrier gas also depends on multiple parameters: catalyst density and size, catalyst flow rate, target velocity Ucata, line diameters and lengths, vector gas viscosity, the invention being adapted as a function also of the latter, but in any event, it generally remains, conventionally, much lower than 1 kg/m³.

The density of the gas g1 is chosen according to the invention at a value greater than that of the enriched hydrogen under the same operating conditions.

This density increase may be obtained in various ways, which will form the subject of the following examples.

All the examples that follow refer to the catalytic reforming process. The invention applies very analogously to the catalytic dehydrogenation processes, with the same technical effect and the same improvements observed by applying the invention; certain operating conditions may, however, differ, notably the pressure and temperature, as already described above.

EXAMPLES

Examples 1 to 5 correspond to a first embodiment of the invention, which consists in changing the chemical composition of the carrier gas to increase the density thereof, either by eliminating the enriched hydrogen and replacing it with another denser chemical species, or by adding to the enriched hydrogen one or more denser gases to increase the mean density of the gas phase, or by eliminating the enriched hydrogen and replacing it with several denser gases.

Example 1

The increase in density of the vector gas is obtained by modifying the composition of the gas g1, which is, here, according to the invention a gas 100% composed of nitrogen (which may, however, contain impurities in small amount). For a mean lift line temperature of 300° C. and a mean absolute pressure of 0.55 MPa, the nitrogen density is equal to 3.23 kg/m³

Example 2

The increase in density of the vector gas is obtained by modifying the composition of the gas g1, which is, here, according to the invention a gas 100% composed of C1 to C6 light hydrocarbons (which may, however, contain impurities in small amount): a composition example is given in table 1 below.

TABLE 1

|  | mol % |
|---|---|
| Methane | 35 |
| Ethane | 25 |
| Propane | 20 |
| i-Butane | 10 |
| n-Butane | 5 |
| i-Pentane | 2 |
| n-Pentane | 2 |
| Hexane | 1 |

This gas mixture has a molar mass equal to 34.3 g/mol. For a mean lift line temperature of 300° C. and a mean absolute pressure of 0.55 MPa, the density of this gas mixture is equal to 3.96 kg/m³.

Example 3

The increase in density of the vector gas is obtained by modifying the composition of the gas g1, which, according to the invention, is a gas partly composed of nitrogen and partly composed of C1-C6 light hydrocarbons according to the composition given in table 2 below:

TABLE 2

|  | mol % |
|---|---|
| Methane | 20 |
| Ethane | 15 |
| Propane | 15 |
| i-Butane | 6 |
| n-Butane | 5 |
| i-Pentane | 4 |
| n-Pentane | 3 |
| Hexane | 2 |
| Nitrogen | 30 |

This gas mixture has a molar mass equal to 35.8 g/mol. For a mean lift line temperature of 300° C. and a mean absolute pressure of 0.55 MPa, the density of this gas mixture is equal to 4.14 kg/m³.

Example 4

The increase in density of the vector gas is obtained by modifying the composition of the gas g1, which, according to the invention, is a gas partly composed of hydrogen (less than 35% by volume) and partly composed of C1-C6 light hydrocarbons: a composition example is given in table 3 below.

TABLE 3

|  | mol % |
|---|---|
| Methane | 15 |
| Ethane | 25 |
| Propane | 20 |
| i-Butane | 2 |
| n-Butane | 3 |
| i-Pentane | 1 |
| n-Pentane | 3 |
| Hexane | 1 |
| Hydrogen | 30 |

This gas mixture has a molar mass equal to 25.9 g/mol. For a mean lift line temperature of 300° C. and a mean absolute pressure of 0.55 MPa, the density of this gas mixture is equal to 2.99 kg/m$^3$.

Example 5

The increase in density of the vector gas is obtained by modifying the composition of the gas g1, which, according to the invention, is a gas partly composed of hydrogen (less than 35% by volume) and partly composed of nitrogen: a composition example is given in table 4 below.

TABLE 4

|  | mol % |
|---|---|
| Nitrogen | 83 |
| Hydrogen | 17 |

The gas mixture has a molar mass equal to 23.6 g/mol. For a mean lift line temperature of 300° C. and a mean absolute pressure of 0.55 MPa, the density of this gas mixture is equal to 2.72 kg/m$^3$.

Example 6

The increase in density of the vector gas is obtained by modifying the composition of the gas g1, which, according to the invention, is a gas partly composed of hydrogen (less than 35% by volume), partly composed of nitrogen and partly composed of C1-C6 light hydrocarbons: a composition example is given in table 5 below:

TABLE 5

|  | mol % |
|---|---|
| Methane | 16 |
| Ethane | 13 |
| Propane | 9 |
| i-Butane | 6 |
| n-Butane | 7 |
| i-Pentane | 5 |
| n-Pentane | 4 |
| Hexane | 3 |
| Nitrogen | 18 |
| Hydrogen | 19 |

The gas mixture has a molar mass equal to 32.4 g/mol. For a mean lift line temperature of 300° C. and a mean absolute pressure of 0.55 MPa, the density of this gas mixture is equal to 3.74 kg/m$^3$.

Example 7

Example 7 corresponds to a second embodiment of the invention, which consists in modifying the pressure of the carrier gas: In this case, the gas g1 remains enriched hydrogen, its working temperature is 300° C. and its absolute pressure is increased to a value P2 of 2.2 MPa, which is four times higher than the mean pressure P1 generally used. The density of the enriched hydrogen under these conditions is 2.62 kg/m$^3$.

Example 8

Example 8 corresponds to a third embodiment of the invention, which consists in modifying the temperature of the carrier gas g1: In this case, the gas g1 remains enriched hydrogen, its working temperature T2 is lowered to 50° C., which is a value six times lower than the temperature T1 of 300° C. generally used. Its pressure remains at a conventional pressure P1 of 0.55 MPa.

The density of the enriched hydrogen under these conditions is 1.16 kg/m$^3$.

The invention may also combine these various embodiments, for example by modifying both the chemical composition of the carrier gas and its pressure or its temperature, or alternatively by keeping a gas such as hydrogen, but modifying both its pressure and its temperature, as illustrated in examples 9 and 10 below.

Example 9

In this case, the gas g1 is enriched hydrogen, its working temperature is reduced to 100° C., which is a temperature three times lower than the temperature T1 of 300° C. generally used, and its absolute pressure is increased to a value P2 of 1.65 MPa, which is a pressure value three times higher than the mean pressure P1 generally used. The density of the gas g1 under these conditions is 3.02 kg/m$^3$.

Example 10

The increase in density of the carrier gas g1 is obtained by combining several modifications. First, the composition of the gas g1 is modified, which in this case is a gas partly composed of hydrogen (less than 35% by volume), partly composed of nitrogen, and partly composed of C1-C6 light hydrocarbons. A composition example is given in table 6 below:

TABLE 6

|  | mol % |
|---|---|
| Methane | 26 |
| Ethane | 8 |
| Propane | 10 |
| i-Butane | 1 |
| n-Butane | 3 |
| i-Pentane | 2 |
| n-Pentane | 1 |
| Hexane | 0 |
| Nitrogen | 15 |
| Hydrogen | 34 |

The gas mixture has a molar mass equal to 16.1 g/mol. Its temperature is also modified, reducing it to a temperature of 200° C., which is a value that is a 1.5 times lower than the temperature T1 of 300° C. generally used. Its absolute pressure is also modified, increasing it to a value P2 of 0.825

MPa, which is a value 1.5 times greater than the mean pressure P1 generally used. The density of the gas g1 under these conditions is 3.38 kg/m$^3$.

Example 11

Figure 7:
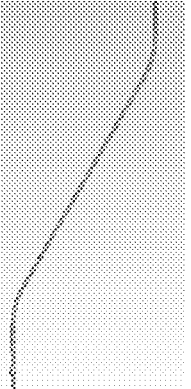
FIG. 7 is a representation of a simulation of a "lift" pipe transporting the catalyst from one reactor to the next.

In this example, the catalyst transport in a lift line representative of an industrial CCR reforming unit was reproduced by CFD simulation using the ANSYS Fluent® software. FIG. 7 shows the first part of the simulated lift line: it is notably composed of an oblique portion having an angle of 60° relative to the horizontal. A reference case was taken of distribution of catalytic particles transported in the line represented in FIG. 7, in the zone of the first elbow and of the start of the oblique part, using a carrier gas of enriched hydrogen type, with a density equal to 0.5 kg/m$^3$, circulating at a velocity of 10.4 m/s. Under these conditions, after passing the first elbow, it is observed that the catalyst circulates in the oblique line, predominantly on the bottom of the tube, and that a particle velocity gradient becomes established between the lower part of the pipe for which the catalyst has a velocity close to 0 m/s, and the upper part, characterized by higher bead velocities.

The same simulation was run, but this time performed according to the present invention, by increasing the density of the vector gas to 3 kg/m$^3$ and by increasing the operating pressure, as in the case of the abovementioned example 7. The velocity of the carrier gas was reduced to 6.6 m/s so as to keep a mean bead velocity identical to that of the reference case. It is then observed that, under these conditions, after passing the first elbow, the catalyst circulates in the oblique line in a much more dilute manner and that the catalyst velocities in this line section are more homogeneous than in the reference case.

The invention claimed is:

1. A process for the catalytic reforming or dehydrogenation of a hydrocarbon feedstock with continuous catalytic regeneration, in which process said feedstock is successively circulated in a plurality of reaction zones in series (R1, R2, R3, R4), a catalyst circulating in a moving bed successively in the plurality of reaction zones in series (R1, R2, R3, R4) and flowing from an upstream end to a downstream end of each of the reaction zones and being transported by a carrier gas phase g1 from the downstream end of one reaction zone to the upstream end of the next reaction zone, wherein said carrier gas phase g1 has a density, measured under operating conditions at a temperature T of between 20° and 550° C., and at an absolute pressure P of between 0.1 and 0.7 MPa, which is greater than 1 kg/m$^3$, wherein said carrier gas phase g1 comprises at least one gas having a molar mass higher than that of hydrogen, which originates from the reforming process itself, as recycling reagent or product or by-product of the reforming, or the temperature of said carrier gas phase g1 is adjusted to a temperature T3 below 200° C. to increase the density thereof, or the pressure of said carrier gas phase g1 is adjusted to a pressure P3 of at least 1 MPa to increase the density thereof.

2. The process according to claim 1, wherein the process is for catalytic reforming, treating a feedstock comprising naphtha to produce aromatic hydrocarbons and/or petrols, or for catalytic dehydrogenation, treating a feedstock comprising paraffin to produce olefins.

3. The process according to claim 1, wherein said carrier gas phase g1 has a density at least 30% greater than that of the hydrogen measured at the same temperature T of between 20° and 550° C., and at the same absolute pressure P of between 0.1 and 0.7 MPa.

4. The process according to claim 1, wherein said carrier gas phase g1 comprises nitrogen and/or at least one C1-C6 light hydrocarbon.

5. The process according to claim 1, wherein said carrier gas phase g1 comprises at least 25% by volume of gas having a molar mass greater than that of hydrogen.

6. The process according to claim 1, wherein said carrier gas phase g1 comprises only one gas having a molar mass greater than that of hydrogen.

7. The process according to claim 1, wherein the at least one gas having a molar mass higher than that of hydrogen originates from the reforming process itself, as recycling reagent or product or by-product of the reforming.

8. The process according to claim 1, wherein the temperature of said carrier gas phase g1 is adjusted to a temperature T3 below 200° C. and 150° C., to increase the density thereof.

9. The process according to claim 1, wherein the pressure of said carrier gas phase g1 is adjusted to a pressure P3 of at least 1 MPa to increase the density thereof.

10. The process according to claim 1, wherein the reaction zones are located, respectively, in reactors (R1, R2, R3, R4) arranged side-by-side, or are superposed on each other, the catalyst flowing continuously in each reactor from its upstream top end to its downstream bottom end, then being transported by said carrier gas phase via a fluid connection from the downstream bottom end of one reactor to the upstream top end of the next reactor of the series of reactors.

11. The process according to claim 10, wherein the fluid connection includes one or more pipes connecting at least one outlet of one reactor to at least one inlet of the next reactor, and optionally vessels or pots.

12. The process according to claim 1, wherein the catalyst is transported via a regeneration gas phase g2 from the downstream end of the last reaction section (R4) of the series of reaction sections to a regeneration zone (RG) and from the regeneration zone to the upstream end of the first reaction zone (R1) of the series of reaction sections (R1, R2, R3, R4), with optional purging of the catalyst of any non-inert gas before it is transported to the regeneration zone.

13. The process according to claim 12, wherein the regeneration gas phase g2 and the carrier phase g1 have the same composition and/or are under the same temperature and/or pressure conditions.

14. The process according to claim 1, wherein the temperature of said carrier gas phase g1 is adjusted to a temperature T3 between 50° C. and 150° C. to increase the density thereof.

15. The process according to claim 1, wherein the pressure of said carrier gas phase g1 is adjusted to a pressure P3 of between 1.5 MPa and 4 MPa to increase the density thereof.

16. The process according to claim 1, wherein said carrier gas phase g1 has a density, measured under operating conditions at a temperature T of between 20° and 550° C., and at an absolute pressure P of between 0.1 and 0.7 MPa, which is greater than or equal to 1.2 kg/m$^3$ and not more than 5 kg/m$^3$.

17. The process according to claim 1, wherein said carrier gas phase g1 has a density at least two times greater than that of the hydrogen measured at the same temperature T of between 20° and 550° C., and at the same absolute pressure P of between 0.1 and 0.7 MPa.

18. The process according to claim 1, wherein said carrier gas phase g1 comprises at least 80% by volume of gas having a molar mass greater than that of hydrogen.

19. The process according to claim 1, wherein the temperature of said carrier gas phase g1 is adjusted to a temperature T3 between 50° C. and 150° C. to increase the density thereof.

20. The process according to claim 1, wherein the pressure of said carrier gas phase g1 is adjusted to a pressure P3 of between 1.5 MPa and 4 MPa to increase the density thereof.

\* \* \* \* \*